United States Patent
Cheng

Patent Number: 5,991,076
Date of Patent: Nov. 23, 1999

[54] OPTICAL CIRCULATOR

[76] Inventor: Yihao Cheng, 36 Meadowbreeze Drive, Kanata, Ontario, Canada, K2M 2L6

[*] Notice: This patent is subject to a terminal disclaimer.

[21] Appl. No.: 08/942,496

[22] Filed: Oct. 2, 1997

Related U.S. Application Data

[63] Continuation-in-part of application No. 08/896,540, Jul. 18, 1997, Pat. No. 5,850,493.

[51] Int. Cl.$^6$ ................................ G02B 5/30; G02B 6/32
[52] U.S. Cl. .............................. 359/495; 359/494; 385/34
[58] Field of Search ..................... 359/495, 494; 385/33, 34

[56] References Cited

U.S. PATENT DOCUMENTS

5,588,078  12/1996  Cheng et al. ............................. 385/33

*Primary Examiner*—Cassandra Spyrou
*Assistant Examiner*—Jared Treas
*Attorney, Agent, or Firm*—Neil Teitelbaum & Associates

[57] ABSTRACT

An at least 3-port optical circulator has first group of optical components, and a second group of optical components, the first group being separated from the second group by an optical distance "1". Each group of optical components has a divider and combiner for dividing an input beam into two beams having orthogonal polarizations and for combining two beams having orthogonal polarizations into a single beam. Furthermore, each group has a GRIN lens for at least substantially collimating or focussing input light, and a polarization rotator between the first divider and combiner and the GRIN lens for making two orthogonal polarization vectors parallel or the two parallel polarization vectors orthogonal to one of or both of the first and second group of optical elements having beam shifting means disposed to shift two beams having a predetermined same polarization. The beam shifting means are of a thickness and orientation so that a beam of light that propagates from a first port sequentially to a second port and from the second port sequentially to a third port are shifted a distance equal to the distance between the optical axes of the first and the third ports.

14 Claims, 9 Drawing Sheets

Fig. 11b

OPTICAL CIRCULATOR

This application is a Continuation-in-Part of application Ser. No. 08/896,540 filed Jul. 18, 1997, now U.S. Pat. No. 5,850,493, entitled Device for Focusing Light Through an Optical Component.

FIELD OF THE INVENTION

This invention relates generally to optical devices that use lenses for collimating and focusing light therethrough, and more particularly for a device that utilizes these lenses to provide a suitable beam for use in combination with another optical component.

BACKGROUND OF THE INVENTION

Currently lenses of various types are used to collimate a diverging light beam exiting an optical waveguide and to focus light that being launched into an optical waveguide so as to more efficiently couple the light.

One of the most ubiquitous building blocks used in the design and manufacture of optical elements is the graded index (GRIN) lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices. The use of a GRIN lens in this invention provides a number of advantages over other conventional lenses, however does not limit the invention to only GRIN lenses.

Advantages of GRIN lenses are that they are relatively inexpensive, compact, and furthermore have parallel flat end faces. In particular, the flat end face of the GRIN lens allows a single lens to be used as a means of collimating or focusing the light, and as well, as a means of tapping light reflected from the end face of the lens.

Quarter pitch focusing/collimating GRIN lenses are known to be used having their collimating ends adjacent one another in a back to back relationship, and having a thin optical element such as a dichroic thin film filter sandwiched therebetween. Such an arrangement may serve as a multiplexing/dempultiplexing optical filter. One or more optical fibers are typically coupled to an input end and to an output end (outwardly facing ends of the lenses) of the device. For these filters to work efficiently, without high coupling losses, it is especially important for the dichoric element disposed between the two lenses to be very thin.

When two quarter pitch GRIN lenses are placed directly adjacent one another with their collimating ends coupled, light launched into the input end from an input optical fiber having its optical axis parallel to but offset with the optical axis of the GRIN lens is directed to a location at the output end of the second GRIN lens. The light leaving the second lens is directly coupled into an output fibre that is parallel with the optical axis and the input optical fibre but offset thereto. However, if the lenses are unduly spaced, light exiting the output (focusing) end exits at an angle to the optical axis of the lens and is difficult to couple to a waveguide, for example to an optical fibre that does not have its optical axis parallel with the optical axis of the lens. This is a particular problem when a relatively thick optical element such as an isolator is disposed adjacent to a GRIN lens.

This invention obviates this difficulty, by providing a lens arrangement that is compatible with a relatively thin or thick optical element disposed between input and output waveguides.

Polarization independent optical circulators generally comprise a birefringent optical element such a rutile crystal for splitting an incoming beam into two orthogonally polarized beams. These two oppositely oriented beams, are then individually operated upon by being passed through at least a non-reciprocal rotating element and at least a second beam shifting crystal that is oriented to shift a beam passing therethrough in a first direction, for example, from port 1 to port 2, and allowing a beam passing therethrough from port 2 to port 3 without shifting. Further, a birefringent crystal is provided for combining at, for example, port 2, the two beams that where originally separated according to polarization components, into a single beam.

The cost of providing a large birefringent crystal is usually significant. For example, a crystal having a dimension of 2 mm, as is suggested in some optical circulator designs, can, according to the teachings of this invention be cut into four crystals, thereby providing significant cost savings.

It is therefore an object of this invention, to provide an optical circulator that minimizes the size of costly optical components.

SUMMARY OF THE INVENTION

In accordance with the invention, an optical circulator is provided wherein the sum of a shifted distance of a shifted beam, is equal to the distance between two adjacent ports on one side of the device.

In accordance with the invention there is provided an optical circulator having at least two polarization dependent beam separation/joining means;

non-reciprocal polarization rotating means disposed between the at least two polarization dependent beam separation/joining means;

beam shifting means disposed between the two beam separation/joining means, said beam shifting means for shifting beams of light oriented in a predetermined manner passing therethrough a distance equal to the distance between to adjacent non-sequential ports on a same side of the optical circulator.

In accordance with the invention, there is provided, an optical circulator having at least first, second and third sequential ports for transmitting light, from the first port to the second port, or from the second port to the third port, circularly, comprising:

i) a first group of optical components, and a second group of optical components, the first group being separated from the second group by an optical distance "1" each group having:

a) dividing and combining means for dividing an input beam into two beams having orthogonal polarizations and for combining two beams having orthogonal polarizations into one beam;

b) a GRIN lens for at least substantially collimating or focussing input light;

c) polarization rotating means between the first dividing and combining means and the GRIN lens for making two orthogonal polarization vectors parallel or the two parallel polarization vectors orthogonal to one another;

ii) one of or both of the first and second group of optical elements having beam shifting means disposed to shift two beams having a predetermined same polarization, the beam shifting means being of a thickness and orientation so that a beam of light that propagates from a first port sequentially to a second port and from the second port sequentially to a third port to be shifted a distance equal to the distance between the optical axes of the first and the third ports; and, wherein at least one of the polarization rotating means is a non-reciprocal rotating element.

In accordance with the invention there is further provided, optical circulator having at least 3 ports comprising:
a) two groups of optical elements, spaced by an optical distance "1" each group having polarization rotating means and a GRIN lens, wherein at least one of said polarization rotating means of at least one group is non-reciprocal, the two groups of optical elements including dividing and combining means for dividing an input beam into two beams having orthogonal polarizations and for combining two beams having orthogonal polarizations into one beam, said dividing and combining means being disposed about a plurality of the ports;
one or both groups of optical elements having birefringent shifting means for shifting a beam propagating therefrom in a first direction a total distance "d" when the beam propagates between two sequential ports, the distance between centres of two adjacent ports on a same side of the circulator being equal to the distance "d".

In accordance with the invention, there is further provided, an optical circulator comprising:
a) two lenses, each lens having an at least substantially collimating end face and a substantially focusing end face;
b) a first group of optical elements optically coupled with a first of the two lenses;
c) a second group of optical elements optically coupled with a second of the two lenses; the first and the second group of optical elements each having,
   i) dividing and combining means for dividing an input beam into two beams having orthogonal polarizations and for combining two beams having orthogonal polarizations into one beam;
   ii) polarization rotating means between the first dividing and combining means and the lens for making two orthogonal polarization vectors parallel or the two parallel polarization vectors orthogonal to one another;
d) a first and a third waveguide adjacent the first group of optical elements; and
e) a second waveguide adjacent the second group of optical elements for launching to the third waveguide or receiving light from the first waveguide, the waveguides each having an end that is separated from its adjacent lens by an optical distance of approximately $d_1$, an optical distance between the two substantially collimating end faces of the at least two lenses being $d_2$, where $d_1$ is approximately equal to one half of $d_2$, and wherein $d_1 > 0$, one of or both of the first and second group of optical elements having beam shifting means disposed to shift two beams having a predetermined same polarization, the beam shifting means being of a thickness and orientation so that a beam of light that propagates from the first waveguide sequentially to the second waveguide and from the second sequentially to a third waveguide to be shifted a distance equal to the distance between the optical axes of the first and the third waveguides; and, wherein at least one of the polarization rotating means is a non-reciprocal rotating element.

BRIEF DESCRIPTION OF THE DRAWINGS

Exemplary embodiments of the invention will now be described in conjunction with the drawings, in which:

FIG. 13b is a diagrammatic view showing the light at different interfaces of the device of FIG. 12 from ports 2 to 3.

DETAILED DESCRIPTION

In the following description, same reference numerals are used for different elements in different figures.

Figure 1A:
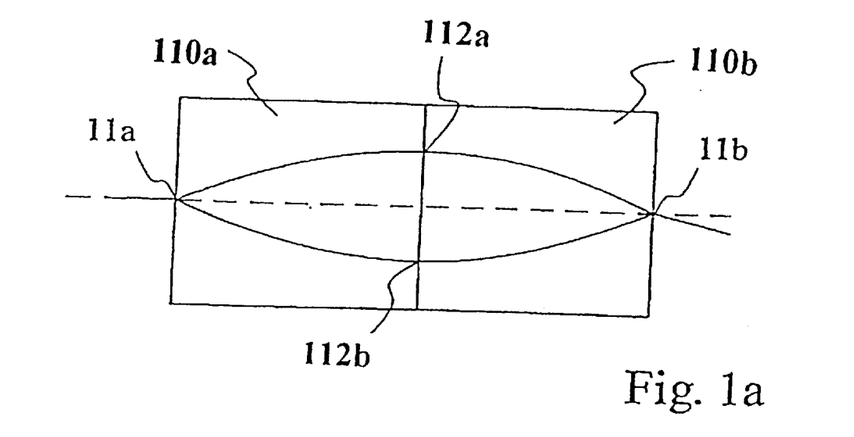
FIG. 1a is a side view of a prior art arrangement of a pair of back to back quarter pitch GRIN lenses having input/output waveguides positioned along the optical axes of the Lenses.

Turning now to FIG. 1a, a pair of quarter pitch GRIN lenses 110a and 110b are shown having their collimating ends inwardly facing and their focusing ends outwardly facing. Two optical waveguides 11a and 11b are shown coaxial with and coupled to the lenses along at the optical axis of the lenses 110a and 110b shown by a dotted line. A beam profile is also shown within the lenses 10a and 10b as if light was launched from one of the waveguides 11a and 11b to a respective lens. It should be noted that the beam profile at the interface between the two lenses extends to a circumference about the lens indicated by points 112a and 112b, being two points on the circumference.

Figure 1B:
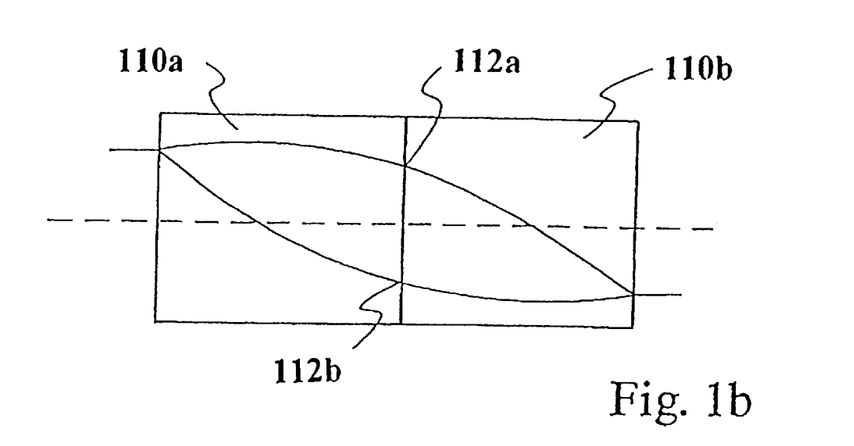
FIG. 1b is a side view of a prior art arrangement of a pair of back to back quarter pitch GRIN lenses having input/output waveguides positioned offset from the optical axes of the lenses.

FIG. 1b illustrates the same pair of GRIN lenses as in FIG. 1a, however the two optical waveguides 11a and 11b are shown to be offset a same optical distance from the common optical axis of the lenses 110a and 110b. Here, the beam profile at the interface between the two lenses extends to the same circumference as in FIG. 1a, however the angle of the beam has varied. By ensuring that there is no separation between the two lenses, and that the optical waveguides are directly coupled with respective lenses, light is most effectively coupled from one waveguide 11a into the other 11b (or vice versa) when the waveguides are parallel to the common optical axis shared by the lenses. A similar arrangement is shown in FIG. 1c, wherein input/output waveguides 11a and 11b are disposed on opposite sides of the optical axis of the lens, from that in FIG. 1b.

Figure 1C:
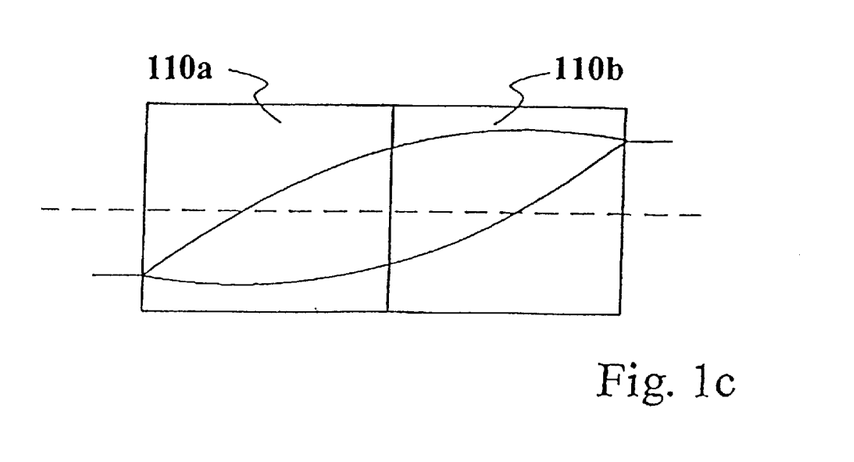
FIG. 1c is a side view of a prior art arrangement of a pair of back to back quarter pitch GRIN lenses having input/output waveguides positioned offset from the optical axes of the lenses.
Figure 2A:
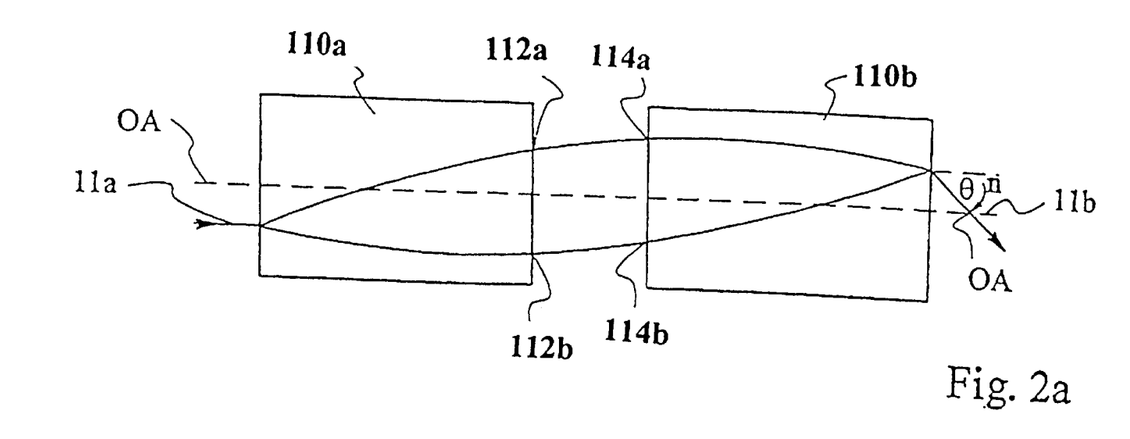
FIG. 2a is a side view of an arrangement of a pair of back to back spaced GRIN lenses having input/output waveguides positioned offset from the optical axes of the lenses; and, FIG. 2b is a side view of an arrangement of a pair of back to back spaced GRIN lenses having input/output waveguides positioned offset from the optical axes of the lenses in accordance with this invention.

Referring now to FIG. 2a, the lenses shown in FIG. 1c are now spaced apart a fixed distance. The optical axis of the waveguide 11 is shown to be parallel to the optical axis OA of the lens 110a. However, in order to efficiently couple light from the output waveguide 11b, it must be non-parallel to the input waveguide 11a and at an angle θ with respect to the optical axis of the lens 110b, dependent upon the amount of separation. Essentially as the separation increases between the two lenses, the output beam diverges from the optical axis of lens 110b. The beam exiting the lens 110a exits at 112a, 112b, and the beam entering the lens 110b enters through 114a and 114b.

Figure 2B:
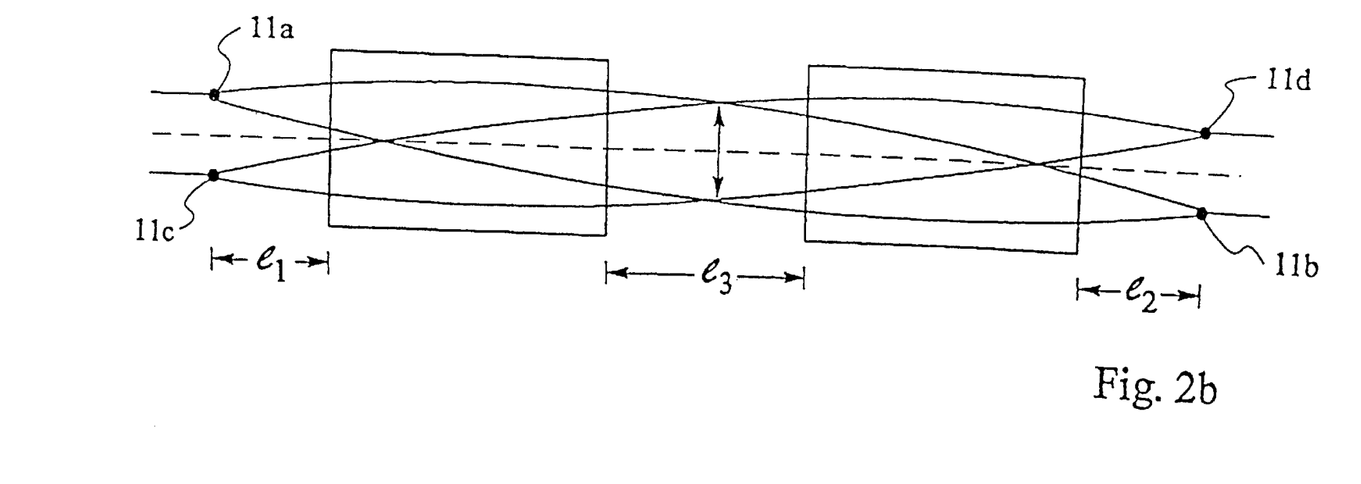

In accordance with this invention, and as is shown in FIG. 2b, light can efficiently be coupled from an input waveguide to an output waveguide that are both substantially parallel with an optical axis of one of the lenses 110a or 110b by ensuring that the spacing of the input waveguides and the spacing between adjacent lenses is within a predetermined ratio. More particularly, the lenses 10a and 10b shown in FIG. 2b are spaced an optical distance $l_3$. The input waveguides 11a and 11c are an optical distance $l_1$ from the end face of the lens 110a. The output waveguides 11b and 11d are an optical distance $l_2$ from their adjacent lens 110b.

For optimum coupling to exist, and for the input and optical wavguides to have their optical axes parallel with the optical axis of the coaxial lenses, the following relationship should exist: $l_1 \approx l_2 \approx 0.5\ l_3$.

Figures 3, 4:
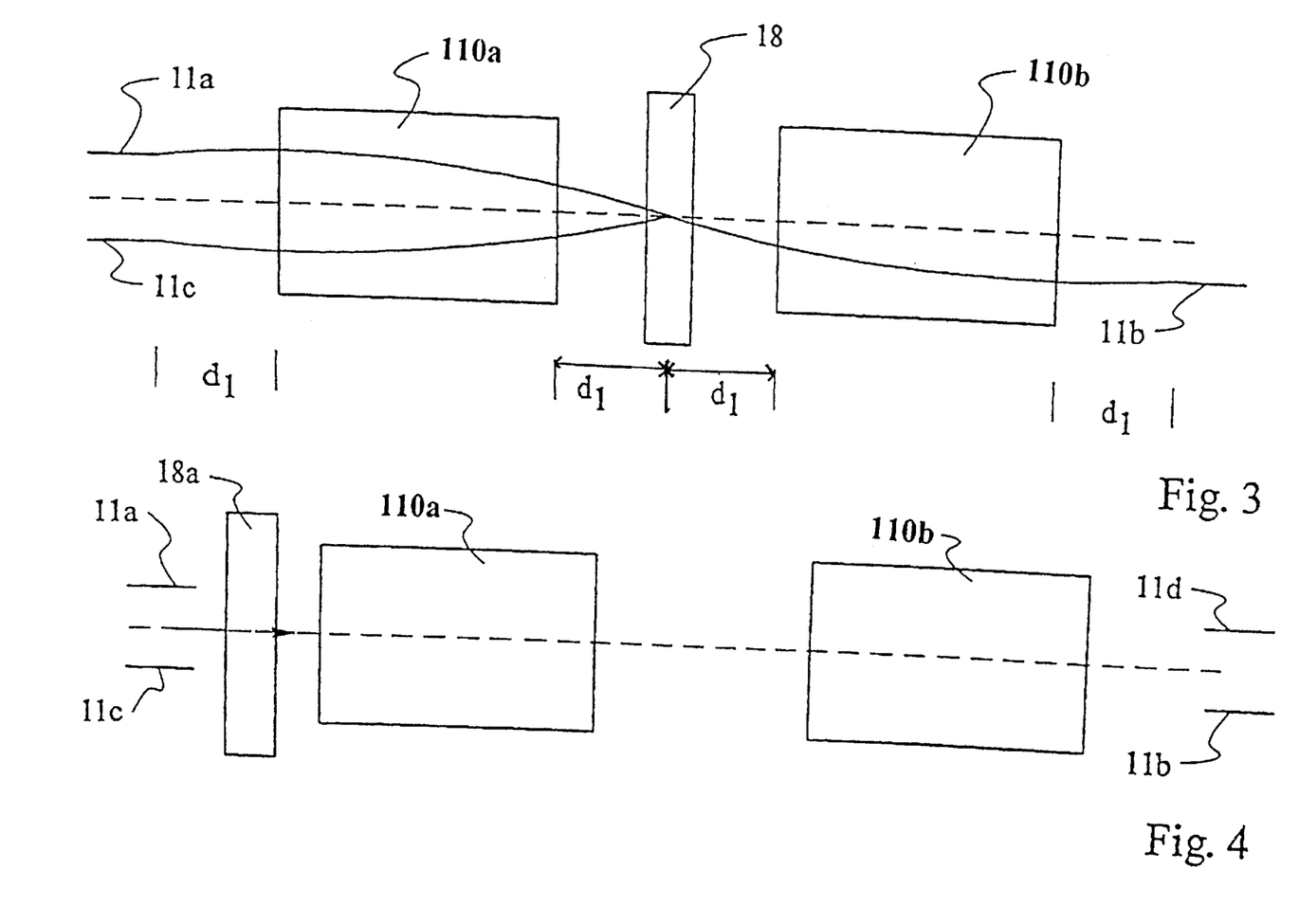
FIG. 3 is a side view of an arrangement of a pair of back to back spaced GRIN lenses having input/output waveguides positioned offset from the optical axes of the lenses and including an optical element disposed between the lenses, in accordance with this invention.
FIG. 4 is a side view of an arrangement of a pair of back to back spaced GRIN lenses having input/output waveguides positioned offset from the optical axes of the lenses and including an optical element disposed between one of the lenses and input waveguides, in accordance with this invention.

Referring now to FIG. 3, an optical arrangement is shown, wherein two focusing/collimating lenses 110a and 110b are shown having their collimating ends facing inward. The space between the lenses is 2d. Input waveguides 11a, 11c and output waveguide 11b are shown spaced an optical distance d from their adjacent lens. An optical element in the form of an optical filter 18 is shown disposed between the lenses.

Conveniently, this invention provides an arrangement of elements that allows a relatively thick optical element to be disposed between the two waveguides, and in this instance between the two lenses.

FIG. 4 is similar to FIG. 3 however, an optical element in the form of an optical isolator 118a is disposed between the input/output optical fibers. fibers. Conveniently optical fiber 11a is coupled with 11b through the isolator and fibers 11c and 11d are optically coupled through the same isolator. By sharing an isolating element in this manner, the cost of providing two physically separate isolators is obviated thereby reducing the overall manufacturing cost.

Figure 5:
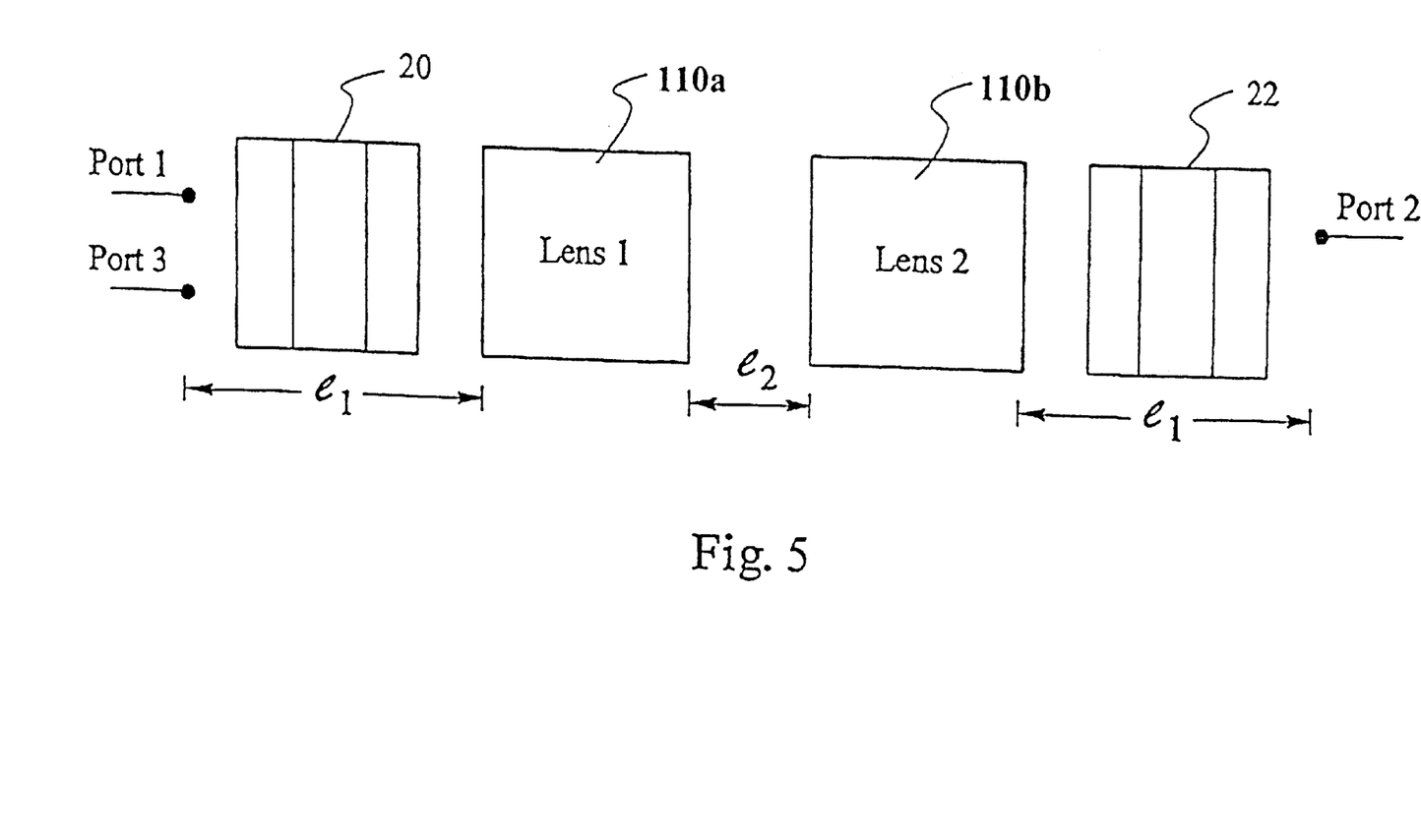
FIG. 5 is a side view of an arrangement of an optical circulator having pair of back to back spaced GRIN lenses having input/output waveguides positioned offset from the optical axes of the lenses and including optical elements disposed between the lenses and input waveguides, in accordance with this invention.

FIG. 5 shows an embodiment wherein an optical circulator is shown having 2 waveguides in the form of optical fibers parallel and adjacent one another indicated as port 1 and port 3. Optical elements such as well known circulating components in the form of polarization rotation means 20 and 22 disposed between two birefringence crystals arranged such that light from port 1 will be received by port 2 and light from port 2 will be received by port 3. By using this arrangement very small optical elements can be used thereby significantly reducing the cost of the device.

Figure 6:
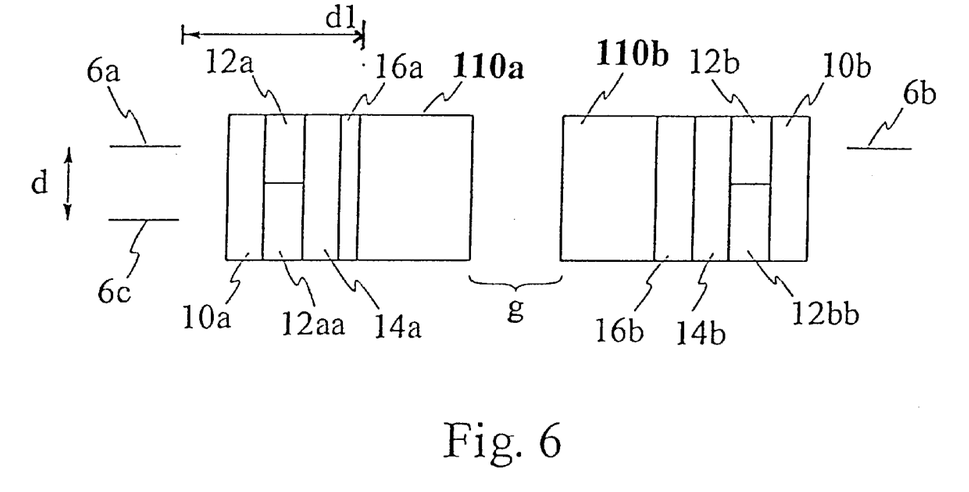
FIG. 6 is a top view of an embodiment of an optical circulator in accordance with this invention.

FIG. 6 further illustrates this advantage of being able to use very small optical components, where very thin rutile crystals are used to shift beams of light a distance equal to the distance between adjacent ports 1 and 3. Now turning to this figure, an optical circulator is shown in accordance with an embodiment of this invention, wherein a beam of light propagating from port 2 on one side of the device, to port 3 on another side of the optical circulator, is shifted distance "d", and wherein the distance between port 1 and port 3 is "d", wherein the distance "d" is the distance between an optical axis through cores of optical fibres at port 1 and port 3. It should be noted, that FIG. 6 is not to scale. It should be noted that ports 1, 2, and 3 are defined to be inwardly facing end faces of optical fibres 6a, 6b, and 6c, respectively.

The optical circulator shown in FIG. 6 is comprised of two symmetric halves spaced by a gap "g"="d2". The optical distance "d1" between the location where light exits the optical fibre 6a and the end of the graded index (GRIN) lens 110a is equal half the optical distance "d2" between the two GRIN lenses 110a and 110b. Stated differently, the optical distance between the location where the light exits the fibre 6b as light would be leaving port 2 destined for port 3, and the end of the GRIN lens 110b, plus "d1" is equal to the optical distance "d2".

FIG. 6 will now be described as light propagates in a forward direction from the optical fibre 6a serving as port 1 towards port 2 at a receiving end of a second optical fibre 6b. The first of the two symmetric halves of the device in this embodiment comprises a sandwich of optical elements including a birefringent crystal in the form of a rutile crystal 10a; two oppositely oriented half wave plates 12a and 12aa adjacent to the crystal 10a; a non-reciprocal Faraday rotator 14a adjacent to the the waveplates 12a and 12aa, a second rutile crystal 16a adjacent to the rotator 14a, and a GRIN lens 110a coupled with the rutile crystal 16a for collimating light propagating across the gap "g" in a direction from port 1 to port 2, and for focusing light propagating in a direction from port 2 to port 3. The second of the two symmetric halves of the device includes the same elements referenced with the letter "b".

For example, as light propagates from port 2, optical fibre 6b to port 3 consisting of an optical fibre 6c. In all of the embodiments described, the optical fibres at ports 1 and 3 are disposed adjacent to and abutting one another. As will be described in greater detail an in reference to other figures, the crystals 16a and or 16b, are of a thickness and orientation such that a minimal shifting distance is provided to allow light to be circulated between three sequential ports, 1, 2, and 3. In contrast, other prior art designs do not optimize by minimizing the shifted distance of beams propagating through the device and therefore require thicker shifting elements.

Figures 7A, 7B:
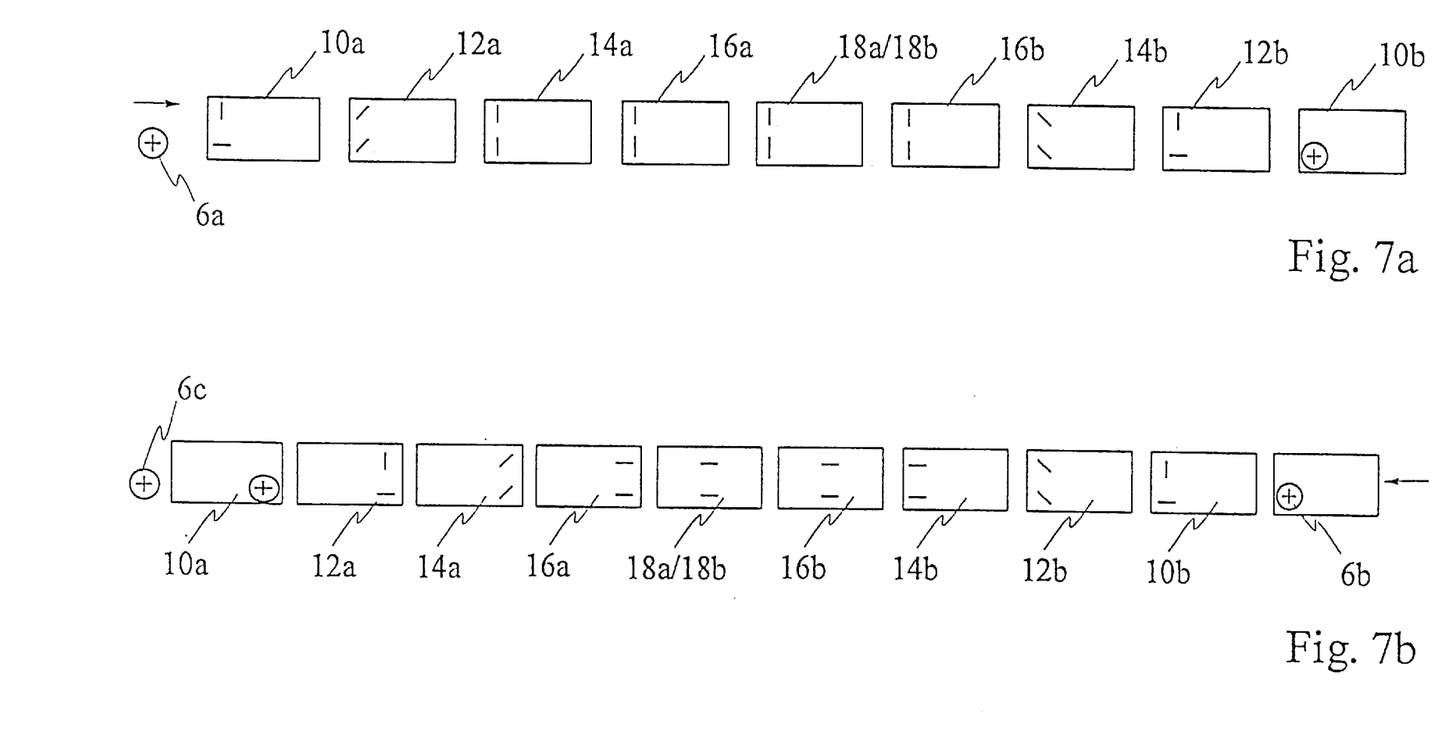
FIG. 7a is a diagrammatic view showing the light at different interfaces of the device of FIG. 6 from ports 1 to 2.
FIG. 7b is a diagrammatic view showing the light at different interfaces of the device of FIG. 6 from ports 2 to 3.

The operation of the optical circulator will now be described with reference to FIGS. 7a and 7b. At stage 6a in the forward direction from port 1 to port 2 a light beam is launched out of the end of the optical fibre 6a. Stage 10a illustrates the state of two separated polarized orthogonal beams as they exit the face 10a of the birefringent rutile crystal. The beams are shown to be rotated oppositely by the two half waveplates 12a and 12aa in stage 12a and at stage 14a the beams are shown to be rotated by another 45 degrees by the non-reciprocal Faraday rotator 14a. Stages 16a and 16b illustrate that the beams are unshifted by the rutile crystals 16a and 16b in the forward direction from port 1 to port 2 as they are polarized. As will be illustrated beams passing through the same rutile crystals orthogonally polarized will be shifted twice. Of course the polarization orientation and direction of the beams is unaffected by the GRIN lenses 110a and 110b which provide the function of collimating and focusing the beams. At stage 14b the Faraday rotator rotates the beams. Further rotation occurs by the half waveplates indicated at stage 12b. Stage 10b shows the beams combined by the rutile crystal 10b. The beam is subsequently into the end of the optical fibre 6b.

At stage 6b in the reverse direction from port 2 to port 3 a light beam is launched out of the end of the optical fiber 6b. Stage 10b illustrates the state of two separated polarized orthogonal beams as they exit the face 10b of the birefringent rutile crystal. The beams are shown to be rotated oppositely by the two half waveplates 12b and 12bb in stage 12b and at stage 14b the beams are shown to be rotated by another 45 degrees by the non-reciprocal Faraday rotator 14a. Stages 16b and 16a illustrate that the beams are shifted once at each stage by the rutile crystals 16b and 16a in the reverse direction from port 2 to port 3 as they are both extraordinary beams; At stage 14a the Faraday rotator rotates the beams. Further rotation occurs by the half waveplates indicated at stage 12a where the beams are shown as orthogonal. Stage 10a shows the beams combined by the rutile crystal 10a. The beam is subsequently coupled into the end of the optical fibre 6c. In this embodiment, the total the distance the beams are shifted in propagating from port 2 to port 3 is equal to the distance between the optical axes of the two optical fibres 6a and 6c.

Although the embodiment described in conjunction with FIG. 6 performs its intended function, it may not be ideal in certain applications, since the path length followed from port 1 to port 2 is different than the path length from port 2 to port 3.

In order to equalize the path length between ports 1 and 2, and 2 and 3, a similar optical circuit as shown in FIG. 6 is provided, however a reciprocal rotating half waveplate is required to rotate the polarization by 90 degrees, thereby balancing the circuit such that one shift is performed in the direction of port 1 to port 2, and one shift is performed in the direction of port 2 to port 3. The relationship of the total shift from port 1 to port 3 being equal to the distance between port 1 and port 3 is maintained.

In the various embodiments of this invention, the diverging beam directed toward the GRIN lens passes through a plurality of optical elements. Since the beam is diverging, it is preferable for the combined thickness of the optical elements to be as thin as possible, thereby ensuring that the distance between the emanating diverging light exiting a port will pass as short a distance as possible upon reaching the collimating lens. Otherwise the spread of the diverging beam may exceed the boundaries of the GRIN lens, and all of the light may not couple into the lens. Furthermore, spherical aberration that is present toward the outside of the GRIN lens is lessened if the beam launched into the lens has a smaller diameter using the centre portion of the lens. Advantageously, thinner optical elements provide a small distance between a port and its adjacent lens, and the ensure that the diverging beam leaving port 1 or port 2 will travel through the optical elements and will couple efficiently with the GRIN lenses therebetween.

Figure 6A:
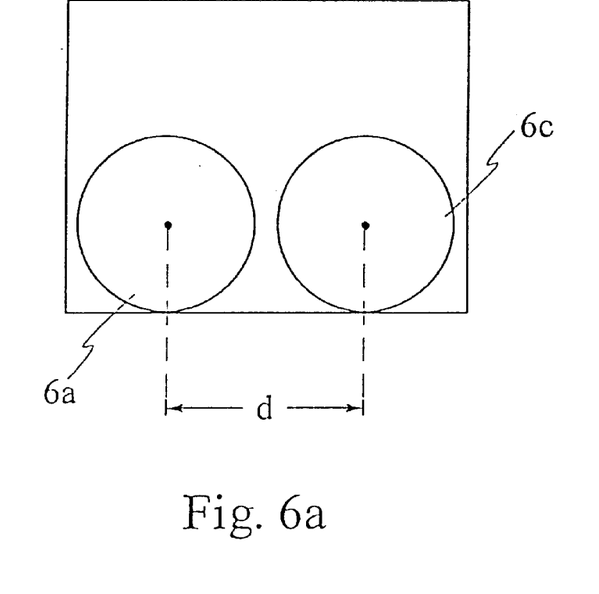
FIG. 6a is an end view of two ports of the optical circulator of FIG. 6.

Turning now to FIG. 6a, ports 1 and 3 of circulator of FIG. 6 is shown wherein two optical fibres 6a and 6c are coupled adjacent one another. When light propagates circularly from port 2 to port 3, the light is shifted a distance equal to the distance "d" shown between the two the two optical fibres. This shifting is accomplished at stages 16a and 16b shown in FIG. 7b.

Figure 8:
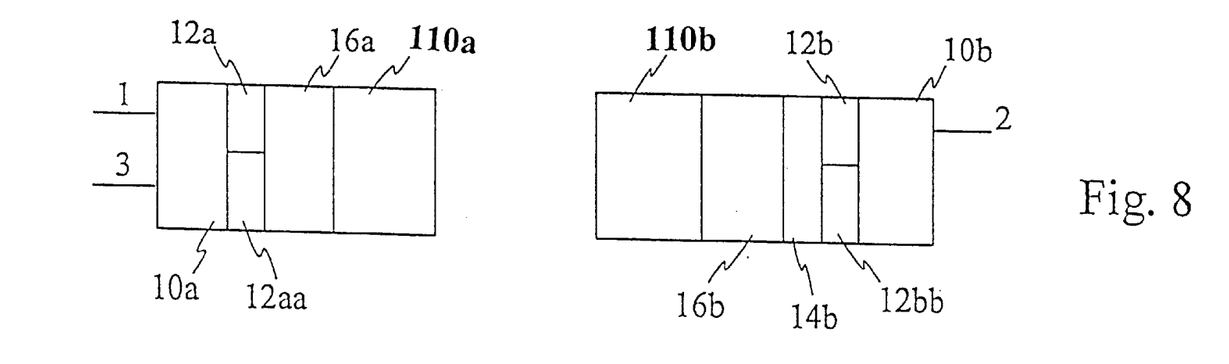
FIG. 8 is a top view of an optical circulator with only a single rotating element is present on one side of the device.

A third embodiment of the optical circulator in accordance with this invention is shown in FIG. 8. The single stage optical circulator is essentially the same as that described in reference to FIG. 6 however only a single rotating element is present on the "a" side of the device. As is illustrated a half waveplate 12a, 12aa is sandwiched between two rutile crystals 10a and 16a.

Figure 9A:
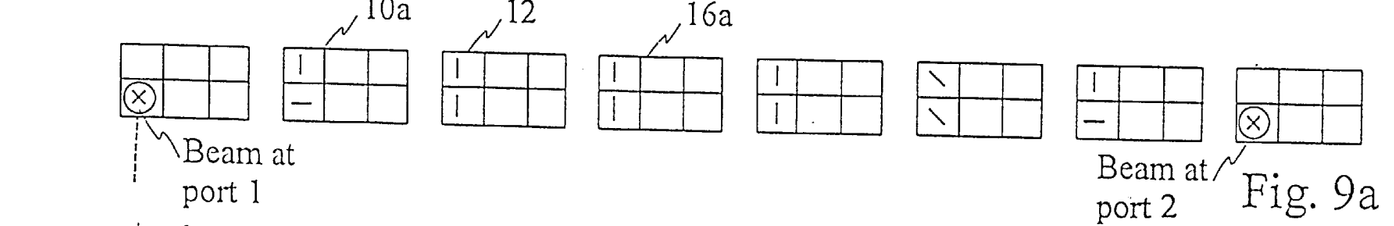
FIG. 9a is a diagrammatic view showing the light at different interfaces of the device of FIG. 8 from ports 1 to 2.
Figure 9B:
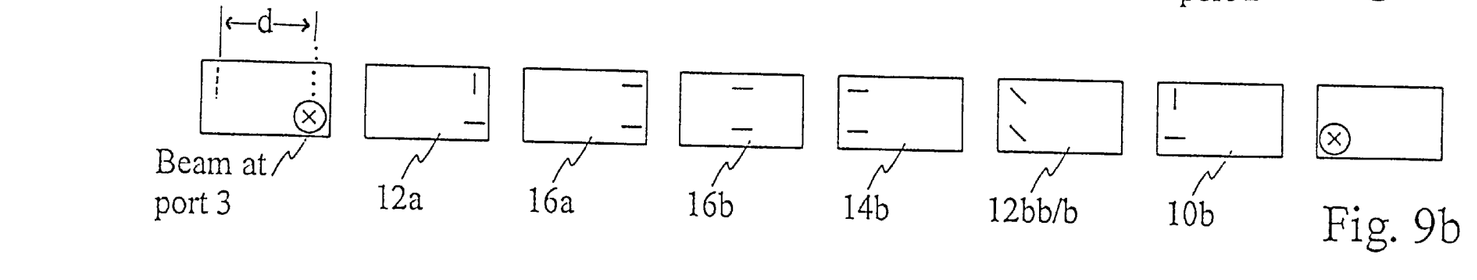
FIG. 9b is a diagrammatic view showing the light at different interfaces of the device of FIG. 8 from ports 2 to 3.

In operation, the circulator of FIG. 8 provides similar alignment of the beams prior to propagation through the rutile crystals 16a and 16b, and therefore, two shifts occur when light propagates from port 1 to port 2. This is illustrated in FIGS. 9a and 9b.

Figure 10:
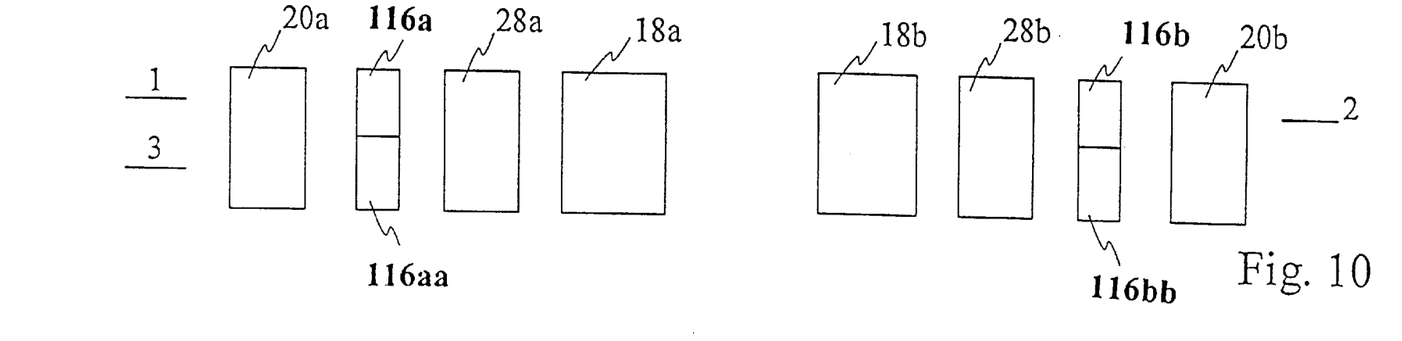
FIG. 10 is an alternative embodiment of a circulator in accordance with the invention.
Figure 11A:
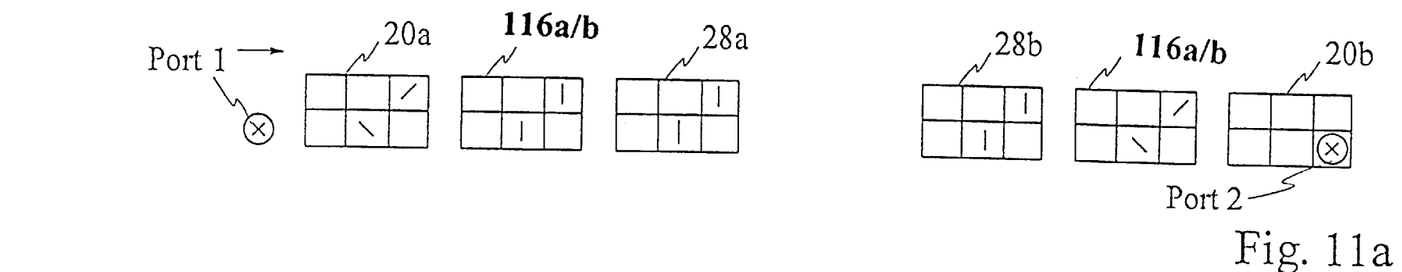
FIG. 11a is a diagrammatic view showing the light at different interfaces of the device of FIG. 10 from ports 1 to 2.
Figure 11B:
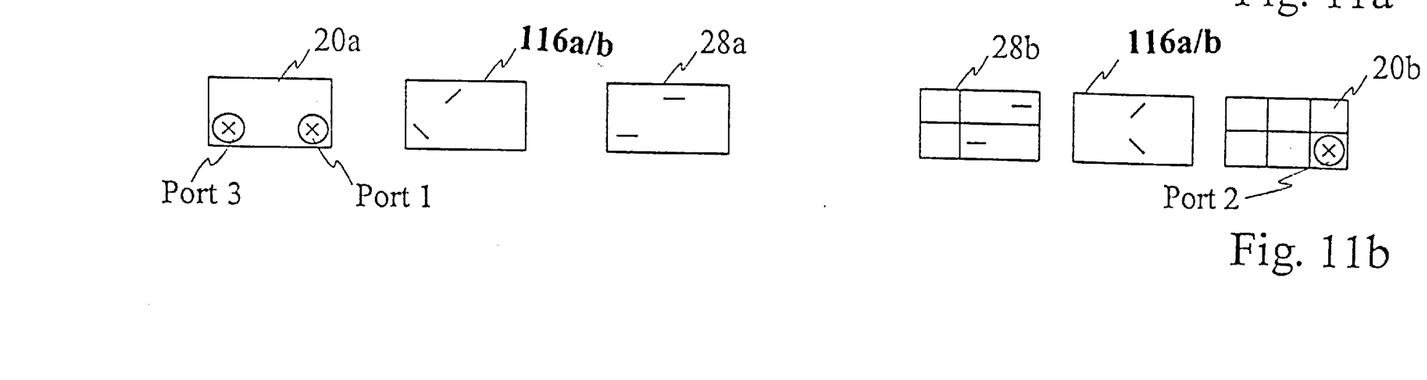
FIG. 11b is a diagrammatic view showing the light at different interfaces of the device of FIG. 8 from ports 2 to 3.

A fourth embodiment of a circulator in accordance with the invention is described in conjunction with FIG. 10 consisting of two symmetrical blocks of optical elements. In this embodiment each block includes two non-reciprocal Faraday rotators, in the absence of reciprocal half wave plates shown in previous embodiments. The device is comprised of a birefringent rutile crystal 20a oriented differently than in previously described embodiments. This is shown more clearly in FIG. 11a and 11b. Adjacent the crystal 20a are two Faraday rotators 16a and 16aa and a second rutile crystal 28a oriented such that the vertically polarized beam rotated by 16a and 16aa is un-shifted 28a in a direction from port 1 to port 2. In common with the embodiments described heretofore, the actual distance between ports one and three is the same as the shifted distance of a beam propagating from port 1 to port 3.

Figure 12:
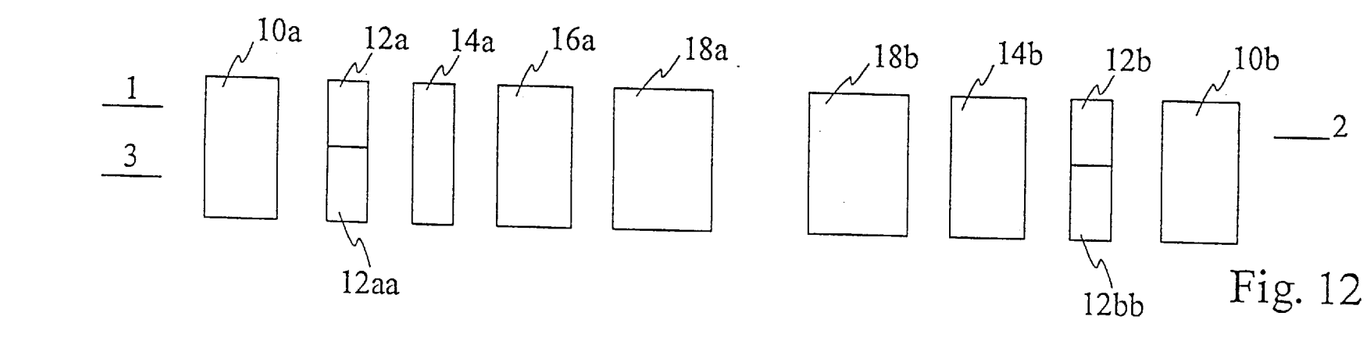
FIG. 12 is a block diagram of an alternative embodiment of the invention wherein one of the rutile crystals is used to achieve full separation between two beams; and, FIG. 13a is a diagrammatic view showing the light at different interfaces of the device of FIG. 12 from ports 1 to 2.
Figures 13A, 13B:
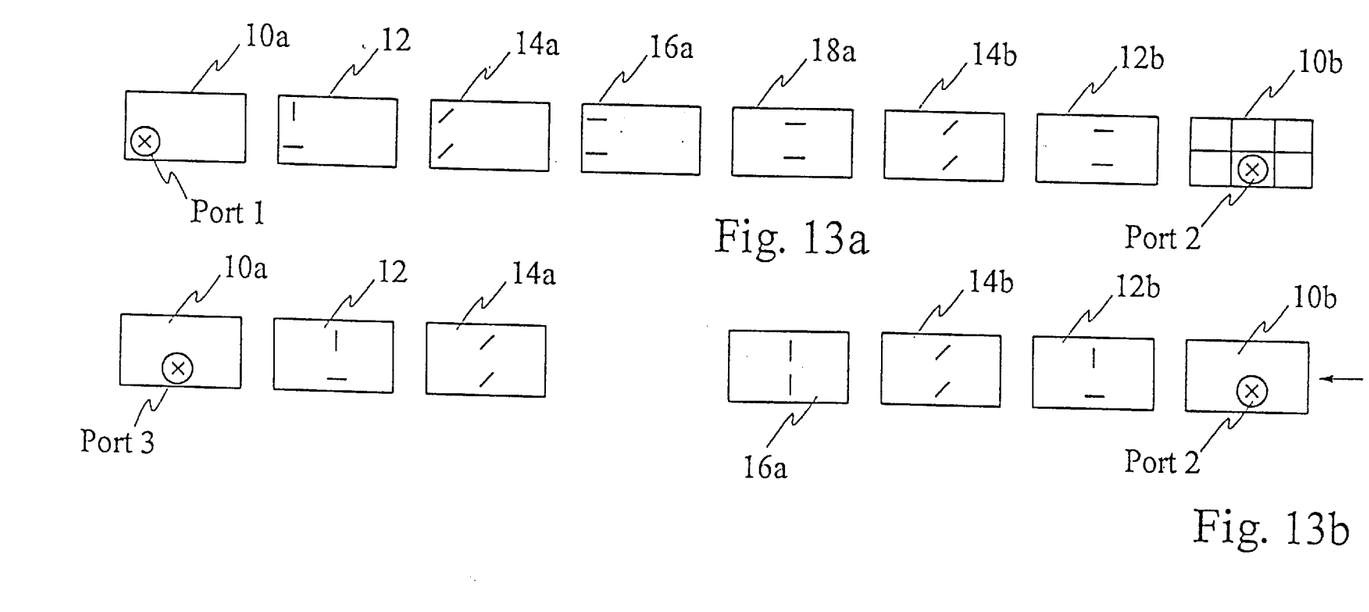

A fifth embodiment is shown in FIG. 12 wherein one of the rutile crystals is used to achieve full separation between the two beams. Referring now to FIG. 12, a block of optical elements comprises a rutile crystal 10a, half wave plates 12a/12aa, a non-reciprocal Faraday rotator 14a, a rutile crystal 16a and a GRIN lens 110a. A second block spaced from the first includes a GRIN lens 110b, a Faraday rotator 14b, half waveplates 12b/12bb and a rutile crystal 10b. The operation of the optical circulator will be readily understood with reference to FIGS. 13a and 13b. As is indicated shifting of the beams occur in a direction from port 1 to port 2, however no shifting occurs when light propagates from port 2 to port 3.

It is apparent from the description of the various embodiments of the invention that the total shifted distance, light is shifted in propagating from, for example, port 1 to port 3, via port 2, is equal to the distance between the optical axes of adjacent ports 1 and 3. The consequence of this, is that using standard optical fibres, of approximately 125 μm in diameter, the shift required of the beam is approximately 125 μm. This small shift is accomplished by using thin optical elements having a thickness of approximately 0.6 mm which provides a small device, that less costly to manufacture using less material, less expensive optical components, and provides enhanced coupling through the GRIN lens by minimizing the distance required for the optical elements between a port and an adjacent GRIN lens.

In the embodiments illustrated in FIGS. 6 and 8 the optical elements are shown to be coupled adjacent and contacting one another. However, in similar embodiments (not shown) some or all of the components may be spaced.

Of course, numerous other embodiments may be envisaged, without departing from the spirit and scope of the invention. For example, the optical fibres can be etched to provide closer spacing between adjacent ports. A further advantage of this embodiment is that yet thinner rutile crystals could be used.

What I claim is:

1. An optical circulator having at least first, second and third sequential ports for transmitting light, from the first port to the second port, or from the second port to the third port, circularly, comprising:
   i) a first group of optical components, and a second group of optical components, the first group being separated from the second group by an optical distance "g" each group having:
      a) dividing and combining means for dividing an input beam into two beams having orthogonal polarizations and for combining two beams having orthogonal polarizations into one beam;
      b) a GRIN lens for at least substantially collimating or focussing input light;
      c) polarization rotating means between the dividing and combining means and the GRIN lens for making two orthogonal polarization vectors parallel or the two parallel polarization vectors orthogonal to one another;
   ii) one of or both of the first and second group of optical elements having beam shifting means disposed to shift two beams having a predetermined same polarization, the beam shifting means being of a thickness and orientation so that a beam of light that propagates from a first port sequentially to a second port and from the second port sequentially to a third port to be shifted a distance equal to the distance between the optical axes of the first and the third ports; and, wherein at least one of the polarization rotating means is a non-reciprocal rotating element.

2. An optical circulator having at least 3 ports at waveguide ends comprising:
   a) two groups of optical elements, spaced by an optical distance "g" each group having polarization rotating means and a GRIN lens, wherein at least one of said polarization rotating means of at least one group is non-reciprocal, the two groups of optical elements including dividing and combining means for dividing an input beam into two beams having orthogonal polarizations and for combining two beams having orthogonal polarizations into one beam, said dividing and combining means being disposed about a plurality of the ports, and wherein said polarization rotating means in each group is disposed between the GRIN lens and the dividing and combining means of said group;

one or both groups of optical elements having birefringent shifting means for shifting a beam propagating therefrom in a first direction a total distance "d" when the beam propagates between two sequential ports, the distance between centres of two adjacent ports at waveguide ends on a same side of the circulator being equal to the distance "d".

3. An optical circulator as defined in claim 2, wherein the birefringent shifting means comprise at least a birefringent crystal.

4. An optical circulator as defined in claim 1, wherein the beam shifting means comprise birefringent crystals.

5. An optical circulator as defined in claim 1, wherein the at least birefringent crystal comprises a rutile crystal.

6. An optical circulator as defined in claim 4 wherein the birefringent crystals are rutile crystals each of a thickness and orientation to shift an incident beam having a predetermined polarization state a distance "d/2".

7. An optical circulator as defined in claim 1, where both the first and second group of optical components have beam shifting means in the form of birefringent crystals disposed to shift two beams having a predetermined same polarization, the beam shifting means being of a thickness and orientation so that a beam of light that propagates from a first port sequentially to a second port and from the second port sequentially to a third port to be shifted a distance equal to the distance between the optical axes of the first and the third ports; and, wherein at least one of the polarization rotating means is a non-reciprocal rotating element.

8. An optical circulator as defined in claim 1, wherein the optical path length of a beam traversed by a beam of light propagating from port 1 to port 2 is the same as the optical path length of a beam of light propagating from port 2 to port 3.

9. An optical circulator comprising:
   a) two lenses, each lens having an at least substantially collimating end face and a substantially focusing end face;
   b) a first group of optical elements optically coupled with a first of the two lenses;
   c) a second group of optical elements optically coupled with a second of the two lenses; the first and the second group of optical elements each having,
      i) dividing and combining means for dividing an input beam into two beams having orthogonal polarizations and for combining two beams having orthogonal polarizations into one beam;
      ii) polarization rotating means between the dividing and combining means and the lens for making two orthogonal polarization vectors parallel or the two parallel polarization vectors orthogonal to one another;
   d) a first and a third waveguide adjacent the first group of optical elements; and
   e) a second waveguide adjacent the second group of optical elements for launching to the third waveguide or receiving light from the first waveguide, the waveguides each having an end that is separated from its adjacent lens by an optical distance of approximately "$d_1$", an optical distance between the two substantially collimating end faces of the at least two lenses being "$d_2$", where "$d_1$" is approximately equal to one half of "$d_2$", and wherein "$d_1$">0, one of or both of the first and second group of optical elements having beam shifting means disposed to shift two beams having a predetermined same polarization, the beam shifting means being of a thickness and orientation so that a beam of light that propagates from the first waveguide sequentially to the second waveguide and from the second waveguide sequentially to a third waveguide to be shifted a distance equal to the distance between the optical axes of the first and the third waveguides; and, wherein at least one of the polarization rotating means is a non-reciprocal rotating element.

10. An optical device as defined in claim 9, wherein the at least collimating ends are inwardly facing and the at least focusing ends are outwardly facing.

11. An optical device as defined in claim 9, wherein the two lenses are substantially coaxial.

12. An optical device as defined in claim 11, wherein the two lenses are GRIN lenses.

13. An optical device as defined in claim 9, wherein at least one of the first and second group of optical elements is disposed between one of the waveguides and one of the lenses.

14. An optical device as defined in claim 9, wherein the lenses are substantially less than quarter pitch lenses.

* * * * *

UNITED STATES PATENT AND TRADEMARK OFFICE
CERTIFICATE OF CORRECTION

PATENT NO. : 5,991,076
DATED : November 23, 1999
INVENTOR(S) : Yihao Cheng

It is certified that error appears in the above-identified patent and that said Letters Patent is hereby corrected as shown below:

Column 1, line 18, "light that being launched" should read -- light being launched --, line 42, "dempultiplexing" should read -- demultiplexing --; line 46, "dichoric" should read -- dichroic --;

Column 5, line 10, "10a and 10b" should read --110a and 110b--, line 32 "waveguide 11" should read --waveguide 11a--, line 49, "10a and 10b" should read --110a and 110b--, line 61, "2d" should read --$2d_1$--, line 63, "d" should read --$d_1$--;

Column 9, line 6, "that less costly" should read --that is less costly--;

Claim 1, line 28, ""g"" should read --(g)--, line 42, "elements" should read -- components--;

Claim 2, line 55, ""g"" should read --(g)--, line 3, ""d"" should read --(d)--, line 7, ""d"" should read --d--;

Claim 5, line 13, "claim 1" should read --claim 4--, line 14, "at least birefringent crystal comprises" should read --birefringent crystals comprise--;

Claim 6, line 15, "claim 4" should read --claim 2--, line 18, ""d/2"" should read --(d/2)--;

Claim 7, line 27, "distance between the optical axes" should read --distance between optical axes--;

Claim 9, line 61, ""$d_1$"" should read --($d_1$)--, line 63, ""$d_2$"" should read --($d_2$)--, line 63, ""$d_1$"" should read --($d_1$)--, line 64, ""$d_2$"" should read --($d_2$)--, line 64, ""$d_1$"" should read --($d_1$)--;

UNITED STATES PATENT AND TRADEMARK OFFICE
CERTIFICATE OF CORRECTION

PATENT NO. : 5,991,076
DATED : November 23, 1999
INVENTOR(S) : Yihao Cheng

It is certified that error appears in the above-identified patent and that said Letters Patent is hereby corrected as shown below:

Claim 14, line 10, the word "substantially" should be deleted.

Signed and Sealed this

Twenty-seventh Day of February, 2001

*Attest:*

NICHOLAS P. GODICI

*Attesting Officer*   Acting Director of the United States Patent and Trademark Office